US006330338B1

(12) United States Patent
Von Ow et al.

(10) Patent No.: US 6,330,338 B1
(45) Date of Patent: Dec. 11, 2001

(54) PROCESS AND DEVICE FOR MIXING DIGITAL AUDIO SIGNALS

(75) Inventors: Andreas Von Ow, Hinwil; Silvio Gehri, Volketswil; Robert Huber, Unterengstringen, all of (CH)

(73) Assignee: Studer Professional Audio AG, Regensdorf (CH)

( * ) Notice: Subject to any disclaimer, the term of this patent is extended or adjusted under 35 U.S.C. 154(b) by 0 days.

(21) Appl. No.: 09/018,915

(22) Filed: Feb. 5, 1998

(30) Foreign Application Priority Data

Feb. 6, 1997 (CH) .................................................. 0262/97

(51) Int. Cl.[7] ...................................................... H04B 1/00

(52) U.S. Cl. ................................. 381/119; 700/94; 369/4

(58) Field of Search .............................. 700/94; 381/119, 381/104, 109; 369/3, 4

(56) References Cited

U.S. PATENT DOCUMENTS

| | | | | |
|---|---|---|---|---|
| 4,876,719 | * | 10/1989 | Nakagami et al. | 381/1 |
| 5,099,234 | | 3/1992 | Kraker et al. . | |
| 5,489,901 | * | 2/1996 | Fukuda et al. | 341/78 |
| 5,517,433 | * | 5/1996 | Morrison | 370/69.1 |
| 5,524,074 | * | 6/1996 | Massie | 381/62 |
| 5,592,403 | * | 1/1997 | Trager et al. | 381/104 |
| 5,621,805 | * | 4/1997 | Loh et al. | 381/119 |
| 5,647,008 | * | 7/1997 | Farhangi et al. | 381/119 |
| 5,703,794 | * | 12/1997 | Heddle et al. | 370/267 |
| 5,774,567 | * | 6/1998 | Heyl | 381/118 |
| 5,930,375 | * | 7/1999 | East et al. | 381/119 |
| 6,041,080 | * | 3/2000 | Fraisse | 381/119 |
| 6,097,558 | * | 8/2000 | Oguro | 381/1 |

FOREIGN PATENT DOCUMENTS

| | | |
|---|---|---|
| 389784 | 1/1990 | (AT) . |
| 0342530 | 11/1989 | (EP) . |
| 0462799 | 12/1991 | (EP) . |
| 2552958 | 4/1985 | (FR) . |

OTHER PUBLICATIONS

An International Search Report dated Nov. 20, 1997.

Teruo Fujino et al., "Digital Mixing Console Meets Professional Mising Needs," *JEE Journal of Electronic Engineering: Supplement–Broadcast Technologies '91*, vol. 28, pp. 38–42 (Jan. 1, 1991).

* cited by examiner

*Primary Examiner*—Xu Mei
(74) *Attorney, Agent, or Firm*—Greenblum & Bernstein, P.L.C.

(57) ABSTRACT

The invention relates to a process and a device for mixing digital audio signals from a first number of inputs (1 to m) into a second number of outputs (21 to n). In order to create a process and a device that are significantly simpler and cheaper, the data words of the incoming audio signals should be supplied in relation to each other so that the data bits arrive in increasing order with the lowest value bit first, in parallel data streams that are synchronized word-wise and bitwise and can be added up in bitwise fashion.

8 Claims, 3 Drawing Sheets

PROCESS AND DEVICE FOR MIXING DIGITAL AUDIO SIGNALS

CROSS-REFERENCE TO RELATED APPLICATIONS

The present application claims priority under 35 U.S.C. § 119 of Swiss Patent Application No. 0262/97 filed Feb. 6, 1997, the disclosure of which is expressly incorporated by reference herein in its entirety.

BACKGROUND OF THE INVENTION

1. Field of the Invention

The present invention relates to a process and a device for mixing digital audio signals from a first number of inputs to a second number of outputs.

2. Discussion of Background Information

Processes and devices similar in general to the type described above are referred to as digital or digitally operating audio mixers. Digitally operating mixers make it possible to split incoming sound signals into a number of different channels or to transmit them all together to arbitrary outputs. The individual sound signals can be changed and combined with other sound signals. In this manner, each signal may be multiplied by a factor in a conventional manner and added to other signals and possibly to also delay the sound signals.

Known digital mixers include devices having inputs connected in pairs or groups to digital signal processors (DSPs) and positioned to easily perform such operations as addition, multiplication, and storage of sound signals. However, these known digital mixers are limited in that the number of inputs that may be routed to one signal processor it determined by the number of suitable interfaces that are provided. As a result, the desired calculating capacity for many channels can no longer be achieved. This is particular important with sound signals because sound signals contain relatively large quantities of data in particular time periods.

The above-noted problems caused by large quantities of data are usually exacerbated due to the fact that a single signal processor is associated with a small number of inputs. Thus, with a given number of inputs and outputs, a particular number of signal processors, which must be connected in cascade fashion, are necessary. The greatest problem arises in adding up sound signals from a large number of inputs orjust from a number of signal processors of this type in a so-called sum bus.

For this reason, embodiments with so-called "TDM buses" or systems with shared memories, i.e., "shared memory" systems, are known as sum buses. A TDM bus is a parallel bus that prepares a time window for data from each input channel so that the signals in the bus arrive serially, i.e., one after another. It is likewise conceivable to use DPRAM memories for this purpose and to connect the processors to each other like a so-called "daisy chain." However, each of these embodiments require technical expenditure and are costly.

SUMMARY OF THE INVENTION present invention provides a process and device for mixing digital audio signals that are significantly simpler and cheaper than those available in the prior art.

In particular, the present invention adds up sound signals from individual inputs or channels with simple circuits or programmable components, e.g., programmable logic components, PLDs, or client-specific integrated circuits ASICs, arranged and utilized for bitwise addition of word and bit synchronized sound signal data streams. Accordingly, the present invention transmits data words with the lowest value bit first, thus, the data streams must be correspondingly formatted. For possible additional processing operations of the signals, i.e., before the addition, a bit-wise multiplication of a relevant data stream may be provided to supply multiple data streams to a summing device. Further, the multiple data streams may be respectively shifted or delayed by one bit with respect to each other. Consequently, the data words of the incoming audio signals are supplied relative to each other so that the data bits arrive, i.e., in increasing order with the lowest value bit first, in parallel data streams that are synchronized word-wise and bit-wise and are added in bit-wise fashion. Accordingly, each output is preceded by a summing circuit that is coupled to at least a part of the outputs via the processing elements.

The advantages achieved by the present invention include that the present device can be embodied or realized in a very reasonably priced manner. One reason for this cost effectiveness is that the addition of data streams requires very little memory. Another reason is that relatively simple and reasonably priced digital signal processors (DSPs) may be used for formatting and for other processing operations on the data from the individual inputs or channels. Provided that a signal processor has a plurality of inputs, a single signal processor can easily operate a number of channels because it only has to perform relatively simple tasks, i.e., because it is no longer necessary for the signal processors to add the data streams. However, the present invention may be arranged such that a signal processor adds the data streams as much as possible so that partial sums are supplied to the summing circuit. This should only occur when the adding can be performed in a single signal processor.

The present invention is directed to a process for mixing digital audio signals from a plurality of inputs into a plurality of outputs. The process includes formatting incoming parallel audio signals composed of data words so that the data words are supplied in an order of lowest value bit to highest value bit, word-wise and bit-wise synchronizing of the formatted parallel audio signals data, and adding the synchronized formatted parallel audio signals in bit-wise fashion.

In accordance with another feature of the present invention, the process further includes selecting one of the formatted incoming parallel audio signals, dividing the one audio signal into a plurality of equivalent parallel signals, forwarding one of the plurality of equivalent parallel signals to a multiplier, and successively bit-wise delaying each of the remaining plurality of equivalent parallel signals. The process also includes forwarding each successively bit-wise delayed parallel signal to a respective multiplier, multiplying the one parallel signal by a lowest bit of a factor for adjusting the one audio signal, multiplying each successively bit-wise delayed parallel signal by a corresponding next bit of the factor, and bit-wise adding the factored one parallel signal and the factored successively bit-wise delayed signals to produce the adjusted one audio signal.

The present invention is directed to a device for mixing digital audio signals that includes a plurality of inputs and a plurality of outputs, a plurality of processing elements, and a plurality of summing circuits. A number of the plurality of inputs includes inputs to the plurality of processing elements and the plurality of outputs include outputs of the plurality summing circuits. Each summing circuit may be coupled with a number of the plurality of processing elements.

In accordance with another feature of the present invention, the summing circuit may include a unit for bit-wise addition beginning with a lowest value bit.

In accordance with another feature of the present invention, the summing circuit may include at least one two-bit or multiple-bit adder.

In accordance with still another feature of the present invention, the summing circuit may include at least three two-bit or multiple-bit adders coupled in cascade fashion.

In accordance with a further feature of the present invention, the processing elements may include a digitally operating signal processor.

In accordance with a still further feature of the present invention, the processing elements may include a summing device, at least one multiplier, and at least one delay unit. Further, the at least one delay unit, the at least one multiplier, and the summing device may be coupled in series for at least one input of the summing circuit.

In accordance with a further feature of the present invention, one or a number of summing circuits form a sum bus for a digitally operating audio mixer.

The present invention may be directed to a process for mixing digital audio signals between a plurality of inputs and a plurality of outputs in which processing units are coupled to the plurality of inputs and a respective summing circuit provides each of the plurality of outputs. Each processing unit may include a number of outputs that correspond to a number of summing circuits such that an output of each of the processing units is coupled to each summing circuit. The process may include processing incoming data words for parallel transmission from lowest order bit to highest order bit from the processing units to the summing circuit, word-wise synchronizing the processed data words between the processing units and the summing circuit, and bit-wise adding the synchronized processed data words at the summing circuits.

In accordance with another feature of the present invention, the process further includes selecting one of the outputs of one of the processing units, dividing a data word output from the one processing unit into a plurality of equivalent parallel signals, forwarding one of the plurality of equivalent parallel signals to a summing device, successively bit-wise delaying each of the remaining plurality of equivalent parallel signals, forwarding the successively bit-wise delayed parallel signals to the summing device, and bit-wise adding the one parallel signal and the successively bit-wise delayed signals in the summing device to produce an adjusted one audio signal.

In accordance with another feature of the present invention, the forwarding of the one parallel signal may include forwarding the one of the plurality of equivalent parallel signals to a multiplier and forwarding an output of the multiplier to the summing device, the forwarding of the successively bit-wise delayed parallel signals may include forwarding each successively bit-wise delayed parallel signal to a respective multiplier and forwarding an output of the each respective multiplier to the summing device, and the process may further include multiplying the one parallel signal by a lowest bit of a factor in the multiplier, and multiplying each successively bit-wise delayed parallel signal by a corresponding next bit of the factor in the multiplier.

In accordance with another feature of the present invention, the process further includes processing data words at at least one the plurality of outputs to transmit the output data word from the highest order bit to the lowest order bit.

In accordance with still another feature of the present invention, the process includes processing successive data words at at least one of the plurality of outputs for parallel transmission of the data words. Further, the process include processing the parallel transmission of the data words so that each data word is transmitted from highest order bit to lowest order bit.

In accordance with a further feature of the present invention, the bit-wise adding may be performed with the following formula:

$$Tn=(\overline{a}_n\times\overline{b}_n\times cy_{n-1})+(\overline{a}_n\times b_n\times\overline{cy}_{n-1})+(a_n\times\overline{b}_n\times\overline{cy}_{n-1})+(a_n\times b_n\times cy_{n-1}),$$

where “×” indicates a logical “AND” and “+”indicates a logical “OR”;

where $a_n$, represents the value of the nth bit of signal a;

where $b_n$ represents the value of the nth bit of signal b;

where $T_n$ represents the value of the nth bit of the sum; and where $cy_{n-1}$ represents the value of the carry bit calculated when summing $a_{n-1}$ and $b_{n-1}$.

Further, the carry bit may be calculated according to the following formula:

$$cy_n=(a_n\times b_n\times\overline{pr})+(a_n\times cy_{n-1}\times\overline{pr})+(b_n\times cy_{n-1}\times\overline{pr}),$$

where pr represents the end of a word.

The present invention may be directed to a device for mixing digital audio signals between a plurality of inputs and a plurality of outputs. The device may include processing units coupled to the plurality of inputs and summing circuits to provide each of the plurality of outputs. Each processing unit may include a number of outputs that correspond to a number of summing circuits and an output of each of the processing units may be coupled to each summing circuit.

In accordance with another feature of the present invention, the summing circuits may include a plurality of two-bit or multi-bit adders coupled in cascade fashion.

In accordance with yet another feature of the present invention, the device may further include a processing element coupled to at least one of the outputs of a processing unit. Further, the processing element may include a summing device, at least one multiplier, and at least one delay unit. Still further, the at least one delay unit, the at least one multiplier, and the summing device may be coupled in series to apply the at least one output of the processing unit as at least one input of the summing circuit.

Other exemplary embodiments and advantages of the present invention may be ascertained by reviewing the present disclosure and the accompanying drawing.

BRIEF DESCRIPTION OF THE DRAWINGS

The present invention may be further described in the detailed description which follows, in reference to the noted drawing by way of non-limiting example of a preferred embodiment of the present invention, and wherein.

DETAILED DESCRIPTION OF THE PRESENT INVENTION

Figure 1:
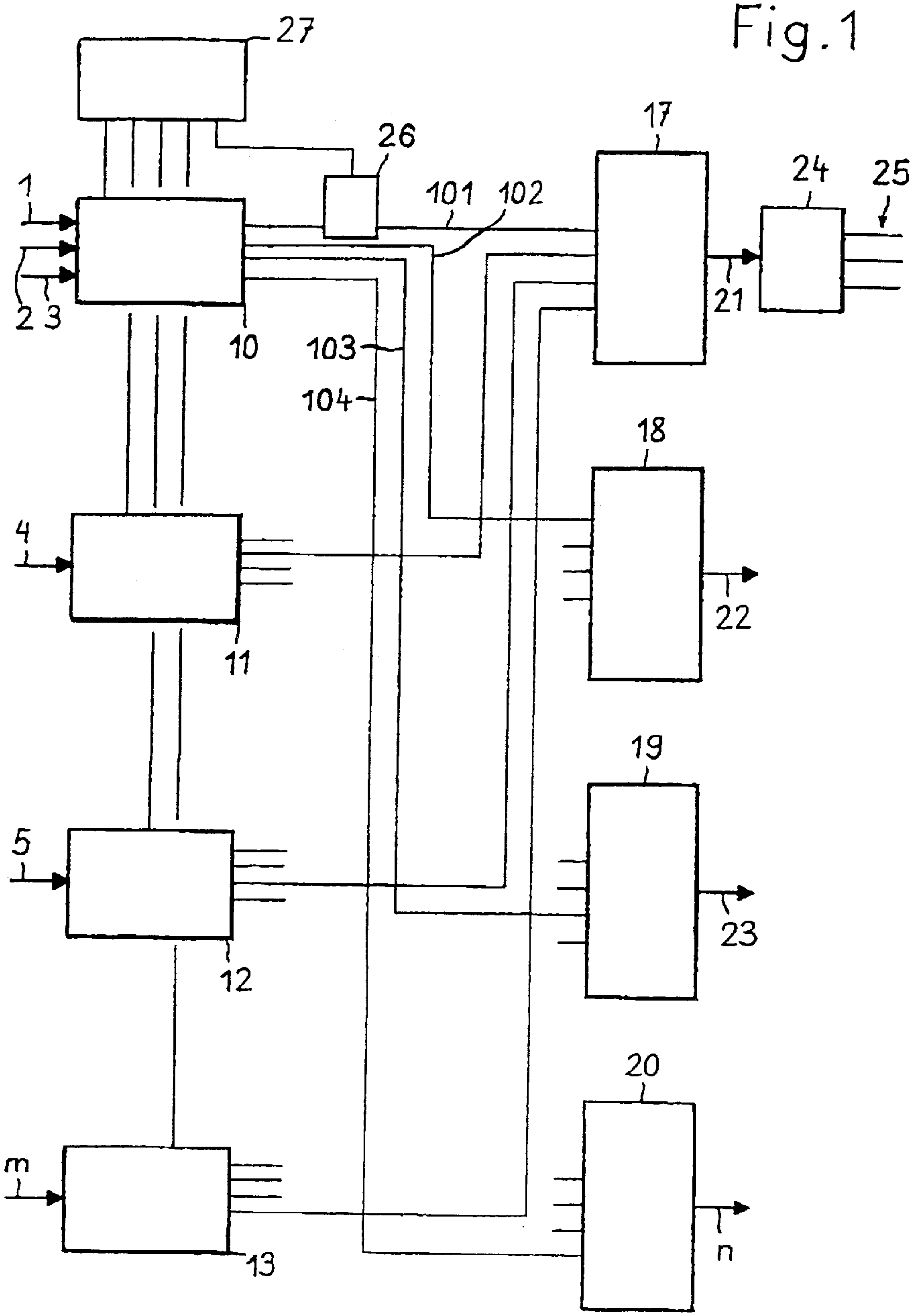
FIG. 1 illustrates a block diagram of a device according to the invention.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figure making apparent to those skilled in the art how the invention may be embodied in practice.

FIG. 1 illustrates a device for mixing digital audio signals having a plurality of inputs 1, 2, 3, 4, 5, . . . m. The number m represents the number of inputs (channels), which according to current standards is, e.g., up to m=64 channels. Each input 1 to m is fed into a processing unit 10, 11, 12, and 13, which may be, e.g., either a digitally operating signal processor DSP or a unit for digital signal processing. Processing units 10, 11, 12, and 13 may be provided with a plurality of inputs, for example, as illustrated with regard to processing unit 10, which receives input 1, 2, and 3. The device also includes a plurality of outputs 21, 22, 23, . . . n. The number n represents the number of outputs, which according to current standards, may be, e.g., n=32 outputs. Each output 21, 22, 23, and n may be an output of a respective summing circuit 17, 18, 19, and 20.

Each processing unit 10, 11, 12, and 13, and each input 1–m, may communicate via connections with a plurality of, and ideally, all of the outputs 21–n. This communication between the processing unit 10 and the outputs 21–n may be occur via lines 101, 102, 103, 104, which lead from the outputs of processing unit 10 to inputs of summing circuits 17–20. Correspondingly, each of the other processing units 11–13 may include a plurality of outputs in which each output of a respective processing unit is coupled to a different summing circuit 17–20. FIG. 1 shows the outputs and inputs of the processing units and summing circuits, respectively, however, for the purposes of clarity, only the coupling between the outputs of processing unit 10 and the inputs of summing circuits 17–20 and the coupling between an output of each of processing units 11, 12, and 13 to the inputs of summing circuit 17 is shown. However, it is recognized that similar connection of each processing unit to the various summing circuits may be made in accordance with the features of the present invention.

The outputs, e.g., output 21, may be fed into a format converter 24 that includes a plurality of parallel outputs 25. This may be particularly advantageous when audio signals from a plurality of channels are supplied serially via a specific input. Thus, these audio signals may be output in parallel. Format converter 24 may also be utilized to output digital words in an order from highest value bit to lowest value bit.

Furthermore, another processing element 26 may be inserted into the processing unit outputs lines 101, 102, etc. to attenuate or amplify a desired signal. Additional processing element 26, along with processing elements 10–13, may be coupled via control lines 28 to an operating unit 27. Operating unit 27 may include operating elements that are usually present, e.g., on an operating surface of a mixer. Format converter 24 may be, e.g., a digitally operating signal processor (DSP) or a signal processing element. Preferably, summing circuits 17–20 form a sum bus in a digitally operating audio mixer.

Figure 2:
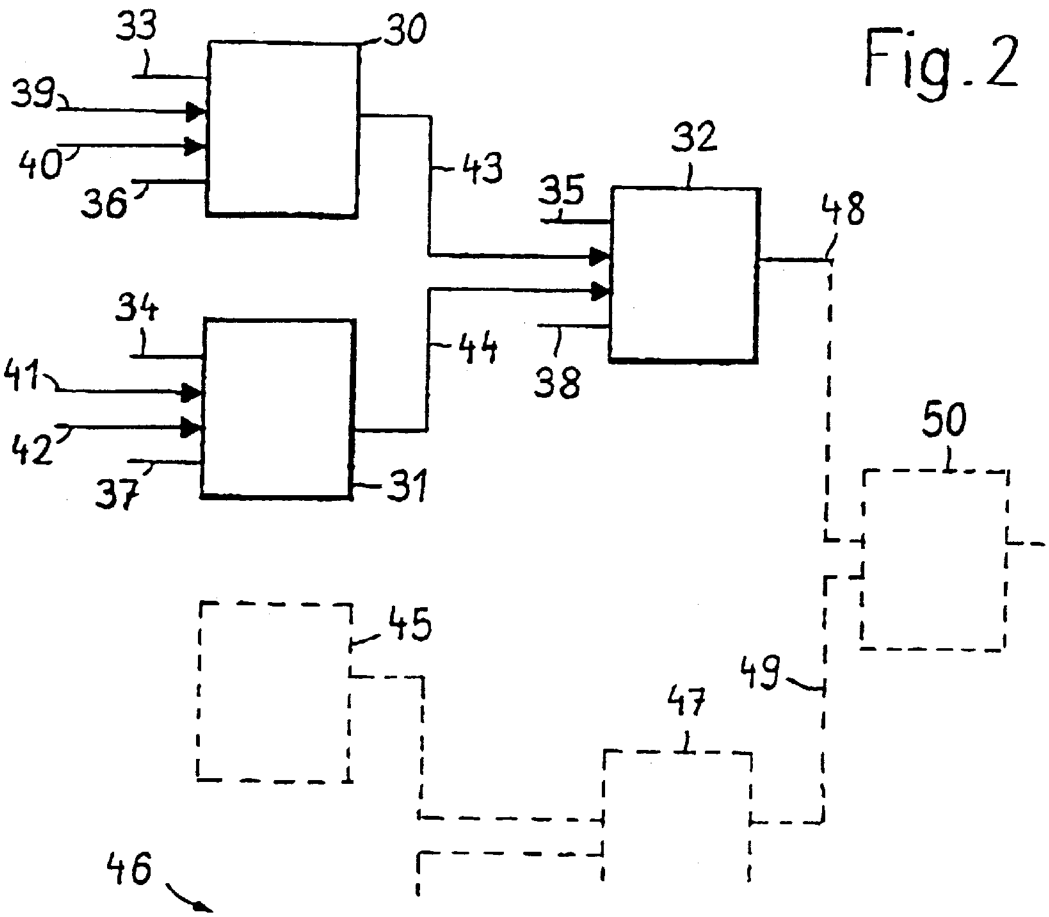
FIG. 2 illustrates a schematic representation of a portion of the device depicted in FIG. 1.

FIG. 2 illustrates an embodiment of summing circuit 17. Summing circuit 17 may include at least three two-bit adders 30, 31, and 32 that have inputs 33, 34, and 35, respectively, for a first clock signal, inputs 36, 37, and 38, respectively, for a second clock signal, and two inputs 39 and 40, 41 and 42, and 43 and 44, respectively, for digitized audio signals. Two of the two-bit adders, i.e., 30 and 31, may be coupled in parallel and their outputs may be coupled to two-bit adder 32 as inputs 43 and 44. If audio signals from more than four inputs 39, 40, 41, 42 are to be processed, the device may be supplemented by utilizing three additional two-bit adders 45, 46, and 47, which are shown in phantom lines (and two-bit adder 46 is not shown). The outputs 48 and 49 of two-bit adders 32 and 47 may be coupled to two-bit adder 50 as inputs. In this manner, the structure for a plurality of inputs may be broadened in cascade fashion as the number of inputs increases. Summing circuit 17 may also be formed with any multiple-bit adders. For example, three-bit adders may be utilized and each three-bit adder may include three inputs for audio signals and a single output. Thus, three three-bit adders may be coupled in parallel such that the respective outputs are coupled to a fourth three bit adder.

Figure 3:
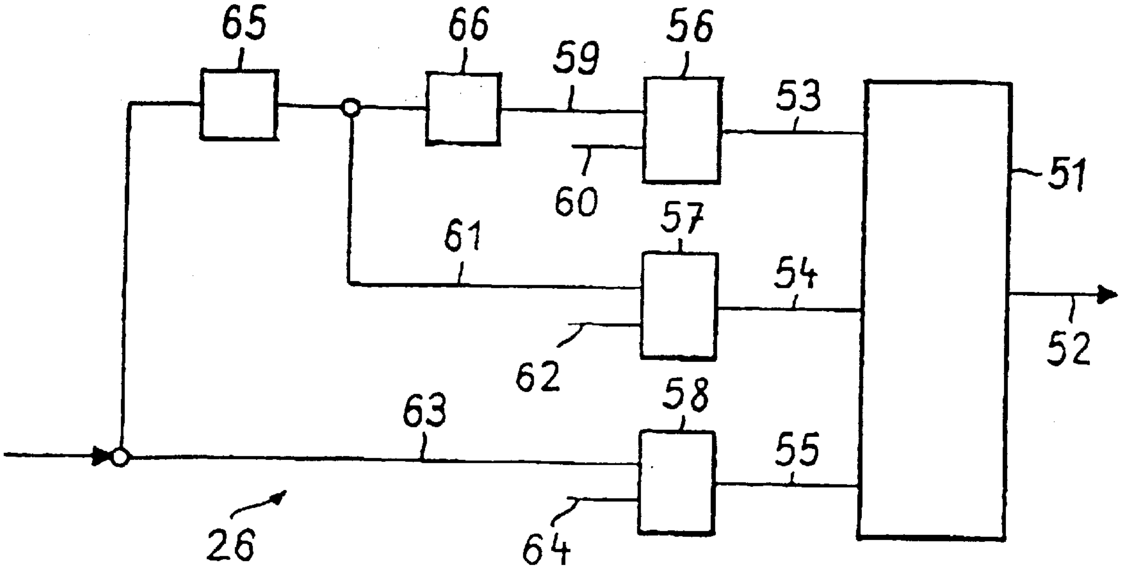
FIG. 3 illustrates a schematic representation of another portion of the device depicted in FIG. 1.

FIG. 3 illustrates an exemplary embodiment of processing element 26. Processing element 26 may include a summing device 51 having a single output 52 and, e.g., three inputs 53, 54, and 55. Each of the inputs 53, 54, and 55 may be preceded by multipliers 56, 57, and 58 that include two inputs 59 and 60, 61 and 62, 63 and 64, respectively. An input 63 may be directly provided to multiplier 58 as an unchanged data stream. Inputs 61 and 59 of multipliers 57 and 56, respectively, may receive delayed data streams because the data streams pass through delay units 65 and/or 66.

Figures 4, 5:
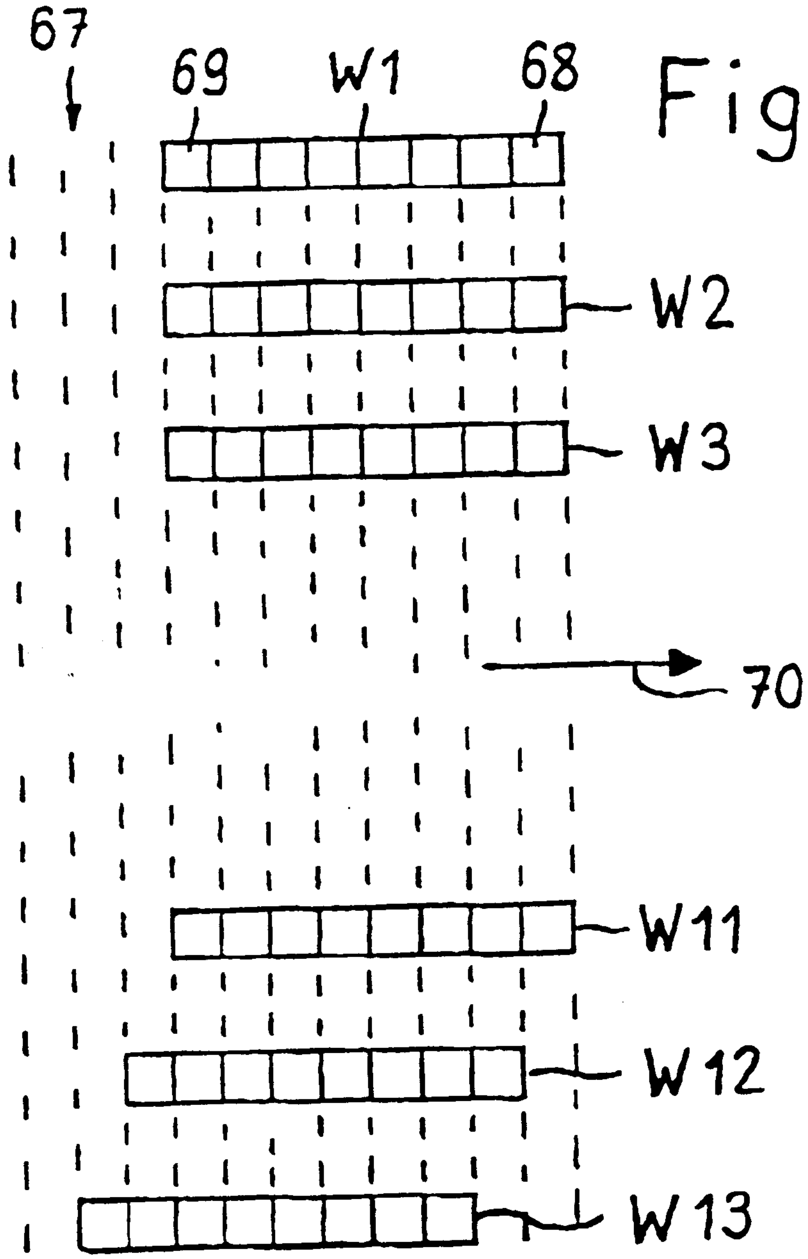
FIGS. 4 and 5 illustrate a schematic representation of various steps of the process of the present invention.

By way of example, FIG. 4 illustrates three data words W1, W2, and W3 which arrive in parallel and synchronized in a bit-wise fashion. Lines 67 indicate first clock signals that control the processes in a bit raster. The data words are moved in a direction indicated by arrow 70. Each data word W1, W2, and W3 is formatted so that a lowest value bit 68 arrives first and a highest value bit 69 arrives last.

FIG. 5 illustrates data words similar to those depicted in FIG. 4, except a time delay is provided between data words W11, W12, and W13. The time delay corresponds to a time period associated with one, two, or more bits, which causes data words W11, W12, and W13 to be positionally or chronologically shifted by one, two, or more bits.

In accordance with the above-discussed structure of the device of the present invention, the device may operate in the following manner: A plurality of digitized sound signals may be applied as inputs 1–m of processing units 10–13. Processing units 10–13 may format the input signals in a known manner so that the lowest value bit of a word is output first and the highest value bit of the word is output last. This formatting is achieved by a corresponding readout instruction from a buffer. All of audio signals output by processing units 10–13, and possibly all of the input audio signals, may be synchronized with first clock signal 67 so that each bit may be synchronously processed by the device, as shown in FIGS. 4 and 5. Moreover, the readout of the data words from processing units 10–13 may take place in a word-synchronous fashion, as shown in FIG. 4. The individual outputs of processing units 10–13 may be controlled via operating unit 27 and control lines 28. As a result, for each output of a respective processing unit, a predetermination is made as to whether an audio signal is sent there and at what intensity.

As a result, each summing circuit 17–20 receives input audio signals via lines 101–104, etc. and adds the signals to produce outputs 21–n. It is noted that a plurality of audio signals may be connected in series and applied to a signal input. Such signals may be handled within the device in the same manner as a single signal. However, at the output of the device, the plurality of signals should be transmitted in parallel, e.g., as shown by output 21 being coupled to format converter 24 to produce parallel outputs 25.

The adding of bit-wise synchronized audio signals in summing circuits 17–20 can be clarified with reference to FIG. 2. For example, a pair of signals, a and b, may be applied to inputs 39 and 40 and two more signals, c and d, may be applied to inputs 41 and 42. A first clock signal for bit-wise synchronization may be applied to inputs 33, 34, and 35, and a second clock signal that indicates the beginning (or end) of a data word, thus providing word-wise synchronization, may be applied to inputs 36, 37, and 38. The second clock signal may be derived from the first clock signal. The signals a and b applied to two-bit adder 30, and, depending upon the bit values being added, an overflow or carry bit cy may be necessary. A formula or instruction for performing the adding of signals a and be may be, e.g., $$Tn=(\overline{a}_n\times\overline{b}_n\times cy_{n-1})+(\overline{a}_n\times b_n\times\overline{cy}_{n-1})+(a_n\times\overline{b}_n\times\overline{cy}_{n-1})+(a_n\times b_n\times cy_{n-1}),$$

where "×" indicates a logical "AND" and "+" indicates a logical "OR". Further, $a_n$ represents the value of the nth bit of signal a; $b_n$ represents the value of the nth bit of signal b; $T_n$ represents the value of the nth bit of the sum; and $cy_{n-1}$ represents the value of the carry bit calculated when summing $a_{n-1}$ and $b_{n-1}$.

Carry bit $cy_n$ may be calculated according to the following formula:

$$cy_n=(a_n\times b_n\times\overline{pr})+(a_n\times cy_{n-1}\times\overline{pr})+(b_n\times cy_{n-1}\times\overline{pr}),$$

where pr represents the end of a word. The value of pr is "1" so that as soon as the most significant bit arrives, the carry bit is prevented from being transferred to the next word. The second clock, which monitors word-wise synchronization, is utilized to determine the end of the word.

The remaining two-bit adders operate according to the same principle to produce a single output signal from two input signals. In this manner, the structure shown in FIG. 2 may be utilized to add an arbitrary number of input signals. The processing carries out the common processes for adding multi-digit numbers, e.g., as would take place in a person's head or as would take place with known calculating methods, i.e., by first adding the lowest value bits 68 so that any resulting carry bit is stored for adding during the addition of the next higher bits. Finally, once the highest value bits 69 are added together, the carry bit, if there is one, may be taken into account. Data streams added in this manner emerge from the summing device via output 21. Then, if necessary, the output data streams may be formatted in format converter 24, e.g., to output data words in the order from highest value bit to lowest value bit, or to divide the data stream to send parallel data steams via lines 25.

The input signals can be changed or weighted in value by processing units 10–13 before being added up. However, this change or weighting may also be performed by processing element 26.

If processing element 26 is formed as, e.g., a device similar to that depicted in FIG. 3, then an input sound signal supplied to processing element 26 is directed, via input 63, to multiplier 58 and directed to delay unit 65. From delay unit 65, an output signal is supplied, via input 61, to multiplier 57 and supplied to delay unit 66. From delay unit 66, an output signal is supplied, via input 59, to multiplier 56. In this manner, the signals present at multipliers 56, 57, and 58 are successively delayed or offset from one another in accordance with the delays of delay units 65 and 66, e.g., one bit. Parallel to the delayed signals input to multipliers 56, 57, and 58, individual bits of an adjustment factor (multiplicand) are input to multipliers 56, 57, and 58 via inputs 60, 62, and 64, respectively, to multiply the input signal by the adjustment factor.

In this manner, an input signal data word arrives via input 63 and is multiplied, i.e., bit-wise, in multiplier 58 with the first bit of the adjustment factor, and in multiplier 57 with the second bit of the adjustment factor, and in multiplier 56 with the third bit of the adjustment factor. In this manner, three data words, each multiplied by a bit of the multiplication factor, are produced that are offset, i.e., delayed, from each other by one bit and applied to a summing device 51 to add the data words. Thus, the three data words W11, W12, and W13 illustrated in FIG. 5 are arranged in a successive one bit delayed manner. Referring to the alignment of data words W11, W12, and W13 in FIG. 5, the bits that are arranged or aligned in corresponding clock signals may be bit-wise added in summing device 51. Thus, an input audio signal may be divided into a plurality of equivalent parallel signals on lines 63, 61, and 59 that are delayed by one bit with an increasing delay. The original signal and the delayed signals may then be multiplied by respective bits of the adjustment factor expressed in a digital value. The resulting signals may then be added together in bit-wise fashion to an altered signal.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A process for mixing digital audio signals from a plurality of inputs into a plurality of outputs comprising:

formatting incoming parallel signals composed of data words so that the data words are supplied in an order of lowest value bit to highest value bit;

word-wise and bit-wise synchronizing of the formatted parallel audio signals data;

adding the synchronized formatted parallel audio signals in bit-wise fashion;

selecting one of the formatted incoming parallel audio signals;

dividing the one audio signal into a plurality of equivalent parallel signals;

forwarding one of the plurality of equivalent parallel signals to a multiplier;

successively bit-wise delaying each of the remaining plurality of equivalent parallel signals;

forwarding each successively bit-wise delayed parallel signal to a respective multiplier;

multiplying the one parallel signal by a lowest bit of a factor for adjusting the one audio signal;

multiplying each successively bit-wise delayed parallel signal by a corresponding next bit of the factor; and bit-wise adding the factored one parallel signal and the factored successively bit-wise delayed signals to produce the adjusted one audio signal.

2. A process for mixing digital audio signals between a plurality of inputs and a plurality of outputs in which processing units are coupled the plurality of inputs and a respective summing circuit provides each of the plurality of outputs, each processing unit comprising a number of inputs that correspond to a number of summing circuits such that an output of each of the processing units is coupled to each summing circuit, the process comprising:

processing incoming data words for parallel transmission from lowest order bit to highest order bit from the processing units to the summing circuit;

word-wise synchronizing the processed data words between the processing units and the summing circuit;

bit-wise adding the synchronized processed data words at the summing circuits;

selecting one of the outputs of one of the processing units;

dividing a data word output from the one processing unit into a plurality of equivalent parallel signals;

forwarding one of the plurality of equivalent parallel signals to a summing device;

successively bit-wise delaying each of the remaining plurality of equivalent parallel signals;

forwarding the successively bit-wise delayed parallel signals to the summing device; and bit-wise adding the one parallel signal and the successively bit-wise delayed signals in the summing device to produce an adjusted one audio signal.

3. The process according to claim 2, the forwarding of the one parallel signal comprising forwarding the one of the plurality of equivalent parallel signals to a multiplier and forwarding an output of the multiplier to the summing device;

the forwarding of the successively bit-wise delayed parallel signals comprising forwarding each successively bit-wise delayed parallel signal to a respective multiplier and forwarding an output of the each respective multiplier to the summing device;

the process further comprising:

multiplying the one parallel signal by a lowest bit of a factor in the multiplier; and multiplying each successively bit-wise delayed parallel signal by a corresponding next bit of the factor in the multiplier.

4. The process according to claim 2, further comprising:

processing data words at at least one the plurality of outputs to transmit the output data word from the highest order bit to the lowest order bit.

5. The process according to claim 2, further comprising:

processing successive data words at at least one of the plurality of outputs for parallel transmission of the data words.

6. The process according to claim 5, further comprising:

processing the parallel transmission of the data words so that each data word is transmitted from highest order bit to lowest order bit.

7. A process for mixing digital audio signals between a plurality of inputs and a plurality of outputs in which processing units are coupled the plurality of inputs and a respective summing circuit provides each of the plurality of outputs, each processing unit comprising a number of inputs that correspond to a number of summing circuits such that an output of each of the processing units is coupled to each summing circuit, the process comprising:

processing incoming data words for parallel transmission from lowest order bit to highest order bit from the processing units to the summing circuit;

word-wise synchronizing the processed data words between the processing units and the summing circuit;

bit-wise adding the synchronized processed data words at the summing circuits; and the bit-wise adding being performed with the following formula:

$$Tn=(\overline{a_n}\times\overline{b_n}\times cy_{n-1})+(\overline{a_n}\times b_n\times\overline{cy_{n-1}})+(a_n\times\overline{b_n}\times\overline{cy_{n-1}})+(a_n\times b_n\times cy_{n-1}),$$

where "×" indicates a logical "AND" and "+" indicates a logical "OR";

where $a_n$ represents the value of the nth bit of signal a;

where $b_n$ represents the value of the nth bit of signal b;

where $T_n$ represents the value of the nth bit of the sum; and where $cy_{n-1}$ represents the value of the carry bit calculated when summing $a_{n-1}$ and $b_{n-1}$.

8. The process according to claim 7, the carry bit being calculated according to the following formula:

$$cy_n=(a_n\times b_n\times\overline{pr})+(a_n\times cy_{n-1}\times\overline{pr})+(b_n\times cy_{n-1}\times\overline{pr}),$$

where pr represents the end of a word.

* * * * *